United States Patent [19]

Aldrich

[11] Patent Number: 4,688,744

[45] Date of Patent: Aug. 25, 1987

[54] JAM TOLERANT ROTARY ACTUATION SYSTEM

[75] Inventor: Allyn M. Aldrich, Rockford, Ill.

[73] Assignee: Sundstrand Corporation, Rockford, Ill.

[21] Appl. No.: 414,730

[22] Filed: Sep. 3, 1982

[51] Int. Cl.⁴ ............................................ B64C 13/34
[52] U.S. Cl. .................... 244/75 R; 244/213; 74/411; 74/665 L; 74/665 R; 74/661
[58] Field of Search ............... 244/213, 87, 214, 215, 244/60, 75 R, 203; 74/661, 665, 405, 411, 710.5, 801; 464/32, 33

[56] References Cited

U.S. PATENT DOCUMENTS

| 2,566,690 | 9/1951 | Wright | 464/32 |
|---|---|---|---|
| 2,944,444 | 7/1960 | Burns | 74/801 |
| 2,966,808 | 1/1961 | Grudin | 74/801 |
| 3,030,052 | 4/1962 | Grudin | 244/75 R |
| 3,073,547 | 1/1963 | Fischer | 244/60 |
| 3,136,499 | 6/1964 | Kessler | 244/60 |
| 3,935,754 | 2/1976 | Commollo | 244/203 |
| 3,958,779 | 5/1976 | Townsend | 244/75 R |
| 4,180,222 | 12/1979 | Thornburg | 244/215 |
| 4,248,105 | 2/1981 | Downing et al. | 244/213 |
| 4,256,277 | 3/1981 | Embree | 244/213 |
| 4,260,121 | 4/1981 | Baston et al. | 244/213 |
| 4,441,675 | 4/1984 | Boehringer et al. | 244/213 |

*Primary Examiner*—Galen Barefoot
*Attorney, Agent, or Firm*—Harold A. Williamson; James A. Wanner; William D. Lanyi

[57] ABSTRACT

This invention relates to a jam tolerant rotary actuation system having multiple flight control surfaces. The actuation system includes in combination an actuation mechanism for each flight control surface. Each actuation mechanism is releaseably coupled to a main drive line shaft. The main drive line shaft is mechanically, serially coupled to each actuation mechanism to thereby establish an actuation assembly.

A power drive unit is provided and is drivingly coupled to either end of the actuation assembly to thereby create an actuation system that will respond to the jamming of one of the flight control surfaces by the release of the actuation mechanism associated with the jammed surface from the main drive line shaft and the actuation of the remaining surfaces by the power drive unit.

7 Claims, 7 Drawing Figures

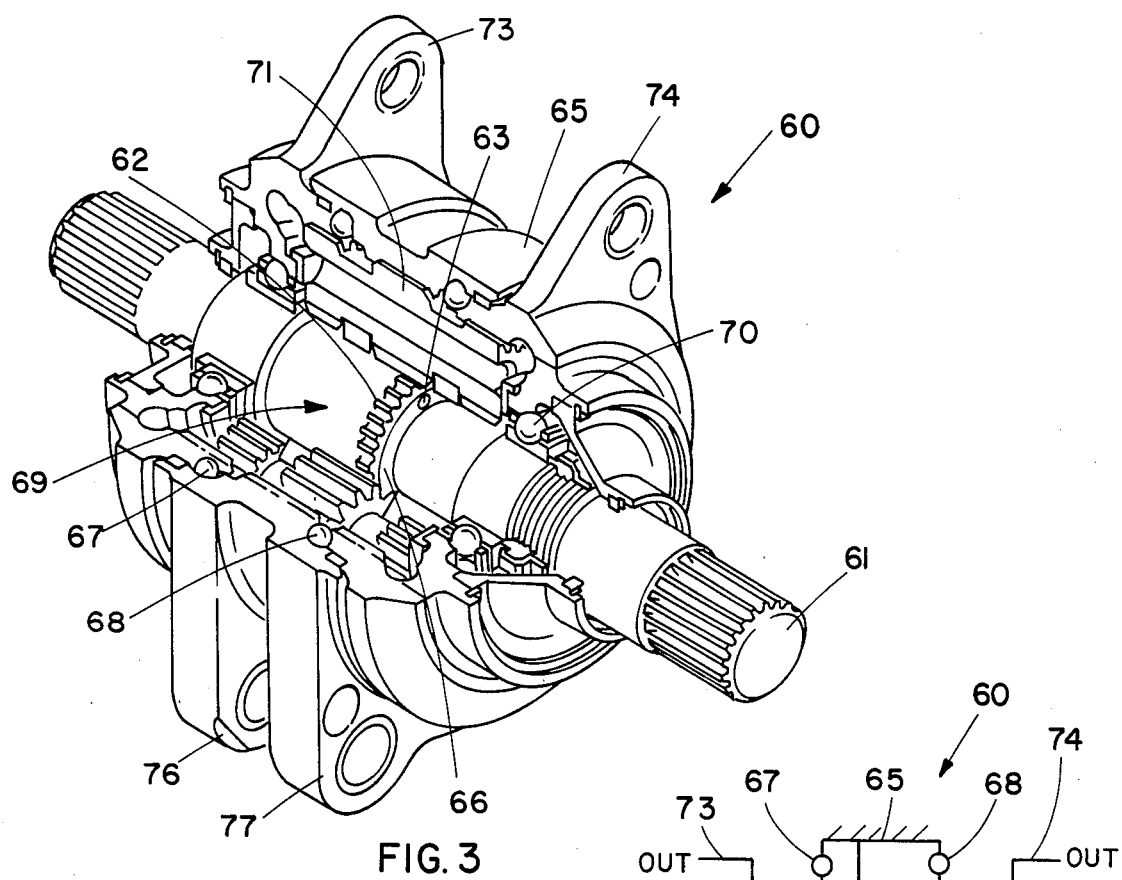
FIG. 3
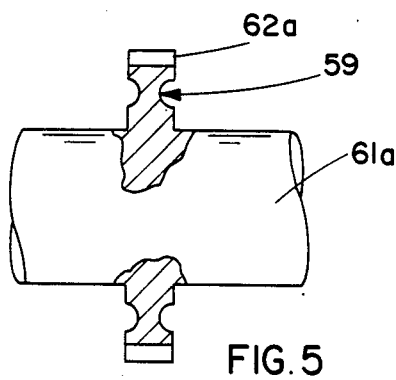
FIG. 3a
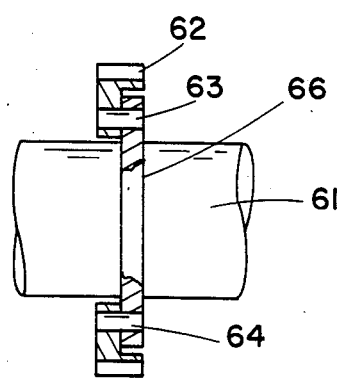
FIG. 4
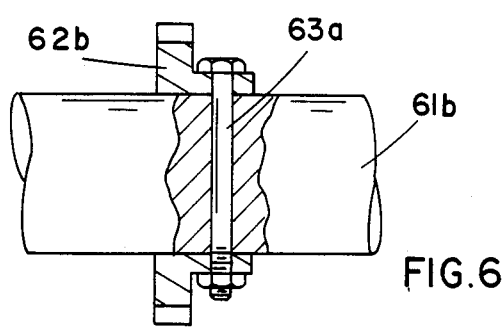
FIG. 5
FIG. 6

JAM TOLERANT ROTARY ACTUATION SYSTEM

TECHNICAL FIELD

This invention relates to an aircraft flight control surface actuation system.

BACKGROUND ART

The use of mechanical actuation systems on aircraft is becoming more wide spread as the advantages of synchronized multiple actuators become better known. To date however, the use of mechanical actuation systems appears to be limited to non-critical flight surfaces. The aircraftindustries' hesitance to use such mechanical actuation systems appears to be rooted in the basic fear that the mechanical actuator can jam and lock up a surface. In the prior art, if this fear is realized and the actuator jams, the entire system will lock up since the actuators are mechanically connected together. On the one hand we see a benefit in the actuators being mechanically connected together in that it allows the desirable end of distributing the load equally into all of the actuators while on the other hand a single jammed actuator locks up the system into an inoperative condition.

In the prior art the two most commonly employed mechanical actuators for use in flight control surface movement are the rotary gear box and the linear ball screw. Of these two types of actuators the rotary gear box seems to be the type that creates the most concern in respect of the matter of jamming.

If a flight control surface or panel as it may be termed, such as a rudder panel, were to jam in a hard-over condition, the effect on the aircraft's manuverability would be profound. While it is possible to fly an aircraft with a non-operating rudder panel or for that matter any other non-operating flight control surface, in many cases it is not possible to operate an aircraft when one of the flight control surfaces are in the hard-over condition.

In the prior art there are a number of patents that are directly concerned with the detection of the failure of a shaft in an actuation system. One of these patents is that of Comollo, U.S. Pat. No. 3,935,754 which detects and indicates the failure of the primary drive train of an aircraft flap actuation system that includes primary and secondary drive trains driven by a common power supply. When the primary drive train fails, a free motion zone formed between the common power supply and the secondary drive train is crossed. Crossing of the free motion zone causes the position of an electro-mechanical sensor(s) to change. The change in position of the electro-mechanical sensor(s) creates or changes the value of an electical signal or signals to provide an indication of the failure of the primary drive train.

The patent to Comollo does not provide, as does the invention to be described hereinafter, an arrangement that will allow for continued operation after a jam type failure as distinguished from a shaft failure.

Another patent thought to be of interest is that of Maltby, U.S. Pat. No. 3,986,689 which patent in addition to providing a shaft failure detection circuit arrangement 73, 74, 77 in FIG. 3, also teaches a flap actuation system where one or more ball screw mechanisms are employed to move the flaps simultaneously on the wings of an aircraft.

In Maltby torque to actuate the ball screw mechanisms is normally transmitted through a primary load path connecting a power drive unit and the ball screw mechanism. In the event that there is a failure in the primary load path, a back-up load path connected between outer ends of the primary path is available to deliver power to the ball screw mechanism so that symetrical positioning of the control surfaces of the aircraft may still be achieved. Connection to the opposite ends of the primary load path, enables torque to be transmitteed through the back-up shaft from either end. Accordingly, should there be a failure, for example, in a middle segment of the primary power path on one side of the aircraft, torque will be transmitted through the shaft of the back-up load path from the opposite side of the aircraft to the point of failure thereby providing power to all of the remaining ball screw mechanisms on the one side of the aircraft from the opposite direction.

The Maltby patent suffers from the same deficiencies as does the Comollo patent in that Maltby does not contemplate, as does the invention to be described hereinafter, the simultaneous operation of three or more flaps or surfaces where one of the surfaces becomes jammed and the remaining surfaces can then be operated to provide some form of control of the aircraft.

A final patent of interest is that of Embree, U.S. Pat. No. 4,256,277 which shares an assignee in common with the inventor of this application. Embree is directed to an actuation system for an aircraft control surface and particularly to an actuator system designed to prevent a symmetric deployment of the control surfaces in the event of a failure of a primary power transmitting component of the system.

In FIG. 1 of Embree it will be observed that to assure symmetric deployment of flap panels 11 on opposite sides of the aircraft in the event of failure in one of the shaft segments 24, a back-up load path is defined by a shaft 55 extending between opposite outer ends 54 of the two outer primary load path segments 24. Both ends of the shaft 55 are driven in the same direction and at the same speed during normal operation of the system so that the shaft is unloaded, except for frictional losses, thereby giving it an essentially infinite load life in comparison to the components of the primary load path. The back-up shaft 55 is spaced separately from the longitudinal axes of the primary load path. Whenever there is a failure in the primary load path 22, torsional deflection of the shaft is sensed and a signal produced which indicates a failure.

The invention of this specification is not primarily concerned with shaft failure, but as noted herein before, the invention permits continued control of the aircraft by utilizing the remaining flight control surfaces when one of the surfaces has become jammed.

DISCLOSURE OF INVENTION

More specifically this invention relates to a jam tolerant rotary actuation system having multiple flight control surfaces. The actuation system includes in combination an actuation mechanism for each flight control surface. Each actuation mechanism is releaseably coupled to a main drive line shaft. The main drive line shaft is mechanically, serially coupled to each actuation mechanism to thereby establish an actuation assembly.

A power drive unit is provided and is drivingly coupled to either end of the actuation assembly to thereby create an actuation system that will respond to the jamming of one of the flight control surfaces by the release of the actuation mechanism associated with the jammed surface from the main drive line shaft and the actuation of the remaining surfaces by the power drive unit.

It is therefore a primary object of the invention to provide a flight control surface actuation system for simultaneously controlling the movement of the surfaces wherein there are means to drivingly interconnect the surfaces such that each surface receives torque from two directions through separate load paths whereby the jamming of a surface results in the release of the jammed surface from the load paths while simultaneously allowing movement of the remaining surfaces to be controlled.

Another object of the invention is to provide a jam tolerant flight control surface actuation system which allows a greater number of individual control surfaces to take the place of the presently employed, few in number control surfaces with the attendant advantage that control structures can all be smaller in size and lighter in weight.

Yet another object of the invention is to provide a jam tolerant rotary actuation system that provides a degraded but proportional control by the remaining flight control surfaces when one of the surfaces jams.

Still yet another object of the invention is to provide a rotary actuation system for a string of actuators each coupled to an element, such that where one of the elements and its actuator becomes jammed dual shafting feeding both ends of the jammed actuator will allow delivery of torque into the jammed actuator of a force sufficient to either shear the actuator input shaft or shear a shear section within the jammed actuator.

In the attainment of the foregoing objects the invention contemplates that a jam tolerant rotary actuation system will be provided for a system that has three or more flight control surfaces.

An actuation mechanism is provided for each flight control surface. Each of the actuation mechanisms are releaseably coupled to a main drive line shaft. The main drive line shaft mechanically, serially couples each actuation mechanism, one to another, to thereby establish an actuation assembly. Each actuation mechanism includes a release device having a shear element mechanically coupled to the actuation mechanism and to the main drive line shaft.

First and second power drive units are drivingly coupled respectively to either end of the actuation assembly to thereby create an actuation system that will respond to the jamming of one of the flight control surfaces by release of the actuation mechanism brought on by the shearing of a shear element in the actuation mechanism associated with jammed surface from the main drive line shaft. This arrangement allows the remaining unjammed surfaces to be driven by either one or both the first and second power drive units.

Other objects and advantages of the present invention will be apparent upon reference to the accompanying description when taken in conjunction with the following drawings:

BRIEF DESCRIPTION OF THE DRAWINGS

FIG. 3 is a three dimensional illustration of an actuation mechanism shown in section to reveal details of the shear/release arrangement of the invention, FIG. 3A is a sketch of the planetary gear relationship in conjunction with the shear/release arrangement of the invention, and FIGS. 4, 5 and 6 each illustrate one species of the shear/release feature of this invention.

BEST MODE FOR CARRYING OUT THE INVENTION

Figure 1:
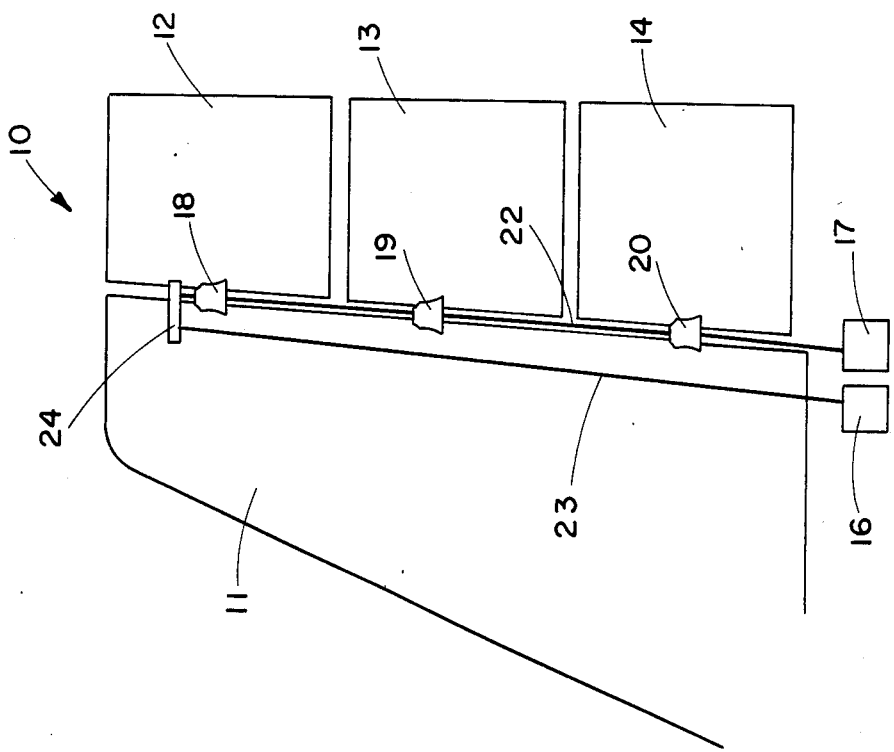
FIG. 1 is a diagramatic illustration of an aircraft rudder and tail assembly with one embodiment of the invention represented.

Reference is now made to FIG. 1 in which the overall mechnical arrangement of the various components of the invention can be seen. FIG. 1 represents a tail section 10 of an aircraft that has a conventional vertical stabilizer 11 and a series of three rudder panels 12, 13, 14 positioned as shown. Each rudder panel is secured in a hinged fashion by rotary actuators 18, 19, 20 to the vertical stabilizer 11. A three dimensional illustration of one of these rotary actuators is shown in FIG. 3 and will be described in detail more fully hereinafter.

The rotary actuators 18, 19, 20 are mechanically releaseably coupled to a main drive line shaft 22. The main drive line shaft 22 has one end drivingly connected to a first power drive unit (PDU) 17. The main drive line shaft 22 passes through each of the rotary actuators 18, 19, 20 and terminates in a driving connection to a transfer gear box 24. The transfer gear box in this embodiment of the invention is of a conventional configuration.

A second power drive unit (PDU) 16 is drivingly connected to the transfer gear box 24 via torque shaft 23.

The arrangement just described allows for the load on the control surfaces or rudder panels 12, 13, 14 to be evenly distributed.

The PDU's 16 and 17 represent the power conversion element of the actuation system. Upon receiving either mechanical or electrical commands (not show) for proportional movement of the flight control surfaces i.e. panels 12, 13, 14, the PDU converts aircraft hydraulic or electric power into rotary shaft power to drive the mechanical actuation system. The PDU's and their power source(s) can be fully fixed in position, located away from the actuators and most importantly, outside of the control surface. This permits the use of hard hydraulic lines to the PDU. Locating the PDU's outside the control surface can also allow for thinner, cleaner aerodynamic surfaces, and permit the control surface to operate in extreme environmental conditions without affecting the hydraulic or electrical system.

It should by readily apparent that a mechanical actuation system of the type being described has the ability to synchronize the position of multiple control surfaces or actuators regardless of load.

Figure 2:
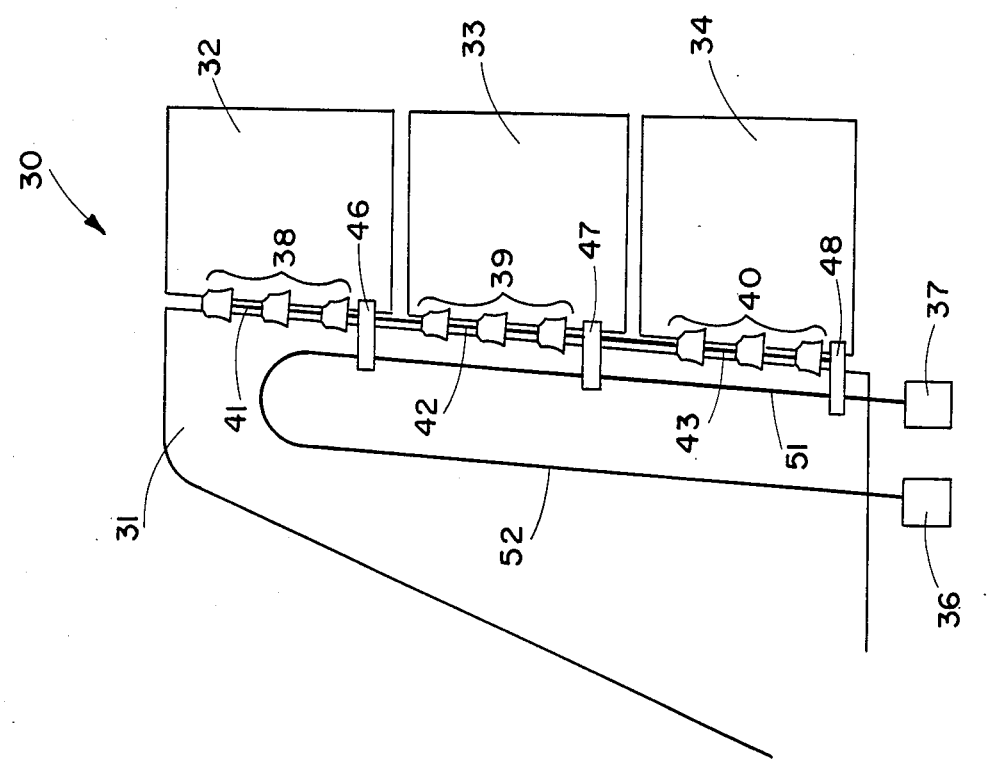
FIG. 2 is a diagramatic illustration of an aircraft rudder and tail assembly with another embodiment of the invention represented.

The geared rotary actuators 18, 19, 20 when installed, as shown in FIGS. 1 and 2, along the hinge line of a control surface joins the surface to the aircraft structure. Accordingly the actuators 18, 19, 20 perform the additional function of a hinge. It should also be noted that use of the actuators along the hinge line eliminates "bumps" on the aircraft surface which are frequently present to accommodate control horns or additional linear actuation equipment.

A further advantage of employing geared rotary actuators along the hinge line is that the attendant resulting structure improves the overall rigidity of the entire aerodynamic system. Several actuators used to power a single panel as will be discussed in respect of FIG. 2, reduces the requirement for rigidity in the panel itself. This can be extremely important where the panels involved are constructed of composite materials.

Each of the PDU's 16, 17 of FIG. 1 presently being described and DPU's of FIG. 2, to be described, has the capability of driving the rudder system of panels 12, 13, 14 against full loads at full rates. Accordingly it will be understood that the two PDU's provide 200% of full operational capability. Parenthetically it is noted that this is a normal requirement on primary flight control surfaces on aircraft, although it is normally performed by having tandem hydraulic cylinders where each side of the cylinder is capable of providing a full torque with the other side being lost.

The main line shaft 22 and torque shaft 23 are capable of carrying the full stall input of either of the PDU's 16, 17.

Each of the actuators 18, 19, 20 are releaseably secured to the main line shaft 22. It is important to note that each panel 12, 13, 14 when disconnected from the respective actuators 18, 19, 20 is free to move without effecting the other two panels.

The transfer gear box 24 as noted earlier received torque delivered via torque shaft 23 and allows this torque to be transmitted across the gear box 24 and down into actuator 18.

It should be understood that the invention also contemplates although not shown in the drawings that the PDU 16 could be located at the top of the main drive line shaft 22, thereby eliminating the torque shaft 23 and drive directly into actuator 18.

The operation of the invention is straight forward and it should be readily comprehended that if anyone of the panel actuators 18, 19 or 20, for example actuator 19 on panel 13 were to jam, the torque coming into actuator 19 through main drive line shaft 22 plus the torque coming into actuator 19 from shafts 23 and 22 would provide full torque from both PDU's 16, 17 to shear the shaft 22 free from the actuator 19. This torque would be many times, i.e. six times, the maximum torque required to drive panel 13 against its maximum operating loads.

Therefore the shear section (still to be described) could easily be set at 300% of the maximum operating load and still provide sufficient margin to break free when six times the torque is put into the shear section all without jeopardizing the normal operation of the system.

Once the actuator 19 is free from the main line shaft 22, actuators 18 and 20 can continue to operate in their normal mode. Accordingly, if panel 13 were jammed in the full right position then the aircraft could be trimmed for straight forward flight by positioning panels 12 and 14 into their mid-point of the left turn position. A right turn would be executed by driving panels 12 and 14 toward a neutral position and allowing the natural drag factor created by the jammed panel 13 to provide a right turning moment. If a left turning moment were required, panels 12 and 14 would be driven past their mid-point in the left turn to give more than a balancing effect against the force factors caused by jammed panel 13 and thereby unpart a left turn moment to the aircraft.

Reference is now made to FIG. 2 wherein there is shown another embodiment of the invention. A tail section 30 is shown which includes a vertical stabilizer 31 and flight control surfaces, i.e. rudder panels 32, 33, 34. The panels 32, 33, 34 each have multiple actuators 38, 39 and 40 which secure the panels to the vertical stabilizer 31. These sets of actuators do not have shear/release devices therein. Each actuator set 38, 39, 40 respectivley has rotary actuator input shafts 41, 42, 43 which shafts drivingly interconnect each actuator of a set, one to another.

First and second PDU's 36 and 37 are provided to power the movement of the panels. PDU 37 is drivingly connected via main drive line shaft 51 to and through off set transfer gear boxes 46, 47, 48. Each of the gear boxes includes a shear/release shaft and gear arrangement of the type shown in FIGS. 4, 5 and 6.

PDU 36 is drivingly coupled via flexible shaft 52 to transfer gear box 46.

It can be seen that with this just described arrangement that if anyone of the panels 32, 33, 34 should jam the shear/release mechanism in an associated transfer gear box would thereby shear while continuing to drive into the remaining offset transfer gear boxes.

While the drawings show a pair of PDU's it is contemplated that a single source of power may be utilized and to this end the PDU's are properly termed a power drive means.

An additional benefit of the dual shafting just described resides in the fact that continued operation is possible in the event of a structural failure of any single piece of shafting.

Reference is now made to FIG. 3 which shows in three dimensional section a rotary mechanical actuator including a shear/release mechanism. The details of the actuator, other than the release feature are not significant to the invention and any rotary mechanical actuator could be employed as long as a shear/release feature was incorporated.

The rotary mechanical actuator illustrated in FIG. 3 provides advantages over the ball screw actuators and linear hydraulic cylinders frequently employed in the functional setting of the invention. This is because portions of these devices extend into ambient during normal operation and then retract back inside the actuators. This exposure causes the portions exposed to ambient contamination to carry back into the actuator ambient contamination. This problem does not arise in respect of the rotary actuators of the type shown in FIG. 3 because this type of actuator does not have parts moving between ambient and internal environments.

In FIG. 3 a rotary actuator 60 is shown having a main line drive shaft 61 passing therethrough. Secured to the shaft 61 is a sun gear 62 which cooperates with a planet gear set 71 which in turn coacts with an unreferenced referenced ring gear on the fixed housing 65. The sun gear 62 and planet gear set 71 establish a differential planetary gear reduction stage 69.

The fixed housing 65 has, as shown at the bottom of FIG. 3, vertical stabilizer mounting arms 76, 77 which are secured to the aircrafts vertical stabilizer by means not shown.

Rudder panel attaching arms 73, 74 are mounted on ball bearings 67, 68 for relative rotary movement in respect of the fixed housing 65.

The sun gear 63 has shear pins 63, 64 cooperatively engaging the sun gear 63 and a shear pin plate 66 secured to the main line shaft 61, all of which can best be seen in FIG. 4.

FIG. 3a will not be described in detail as it merely represents in diagramatic form the differential gear reduction arrangement of the rotary actuator 60 previously described in respect of FIG. 3.

Reference is now made to FIGS. 5 and 6 which illustrate variations of the shear/release mechanisms. It is to be understood that while the gears 62, 62a, 62b respectively of FIGS. 4, 5 and 6 could all be sun gears in the rotary actuators of FIG. 3, the invention also contemplates that these very same shear/release arrangements could be employed in the transfer gear boxes 46, 47 and 48 of FIG. 2.

In FIG. 4, the shear pins 63, 64 will shear when the load on the gear 62 versus torque force on shaft 61 exceeds the shear strength of the shear pins 63, 64.

In FIG. 5 the gear 62a is provided with a necked down section 59 which will provide a shear section under load and in FIG. 6 the shear pin 63a shears in a wholly conventional manner when the gear 62b and shaft 61b experience opposing loads that cause the shear pin 61 to experience shear loads above its design point.

Although this invention has been illustrated and described in connection with the particular embodiments illustrated, it will be apparent to those skilled in the art that various changes may be made therein without departing from the spirit of the invention as set forth in the appended claims.

We claim:

1. An actuation system for aircraft flight control surface means, said flight control surface means having multiple control surfaces that normally move in unison, said actuation system including in combination:
   an actuation means for each control surface, each actuation means integrally mounted at said control surface and mutually mechanically coupled to said control surface and said aircraft,
   power drive means,
   each actuation means releasably coupled to a main drive line means, which main drive lines means passes through each actuation means, said main drive line means is mechanically serially coupled to each actuation means to thereby establish an actuation assembly that allows said control surfces to be driven in unison from said drive line means,
   said actuation means including a release means having a shear means mechanically coupled to said actuation means and to said main drive line means,
   said power drive means simultaneously drivingly coupled to opposite ends of said main drive line means of said actuation assembly to provide total torque thereto greater than a maximum torque required to drive any one flight control surface against its maximum operating loads and thereby create an actuation system that will receive full power drive means torque at said opposite ends of said main drive means to thereby cause said actuation means to respond to the jamming of one of said flight control surfaces by the release of the actuation means release means associated with the jammed surface from said main drive line means when said shear means of said release means is sheared as the result of opposing forces thereon which forces arise when movement of said surface becomes jammed and said power drive means via said main drive line means continues to deliver power to said main drive line means; said main drive line means remaining structurally intact and the actuation of the remaining surface is provided for by said power drive means.

2. The actuation system of claim 1 wherein said main drive line means is a shaft.

3. The actuation system of claim 2 wherein said multiple control surfaces are at least three in number.

4. The actuation system of claim 3 wherein said power drive means is comprised of a first and a second drive unit respectively coupled to either end of said shaft of said main drive line means.

5. An aircraft control surface means actuation system, said control surface means having three or more control surfaces that normally move in unison, said actuation system including in combination:
   an actuation means for each control surface, each actuation means integrally mounted at said control surface and mutuallly mechanically coupled to said control surface and said aircraft,
   first and second power drive means,
   each actuation means releasably coupled to a main drive line means which main drive line means passes through each actuation means, said main drive line means mechanically serially coupling each actuation means one to another via said main drive line means to thereby establish an actuation assembly that allows said control surface to be driven in unison from said drive line means;
   said actuation means including a release means having a shear means mechanically coupled to said actuation means and to said main drive line means,
   said first and second power drive means drivingly coupled respectively to opposite ends of said drive line means of said actuation assembly to provide a total torque thereto that equals the sum of the torques delivered to said drive line means from said first and second power drive means, said total torque being greater than the maximum torque required to drive any one flight control surface and thereby create an actuation system that will receive the sum of the first and second power drive means torque at said opposite ends of said main drive line means to thereby cause said actuation means to response to the jamming of one of said control surfaces by the release of the actuation means release means associated with the jammed surface from said main drive line means when said shear means is sheared as the result of opposing forces thereon which forces arise when movement of said surface becomes jammed and said power drive means via said main drive line means continues to deliver power to said main drive lines means,
   said main drive line means remaining structurally intact and the actuation of the remaining surface is provided for by said first and second power drive means.

6. The actuation system of claim 5 wherein said main drive line means is a shaft.

7. The actuation system of claim 6 wherein said actuation means includes multiple actuator means coupled to a transfer gear means that includes said shear means.

* * * * *